United States Patent [19]

Skrypek et al.

[11] 4,332,316
[45] Jun. 1, 1982

[54] CUP-STACK DELIVERY MECHANISM

[75] Inventors: John P. Skrypek, Mahwah; Robert Williams, Randolph; James W. Dominico, West Paterson, all of N.J.

[73] Assignee: Sun Chemical Corporation, New York, N.Y.

[21] Appl. No.: 132,514

[22] Filed: Mar. 21, 1980

[51] Int. Cl.³ .............................................. B65G 57/28
[52] U.S. Cl. .................................. 198/425; 198/429; 198/749; 414/330
[58] Field of Search ................. 414/48, 105, 108, 330; 198/424–425, 429, 411–413, 406, 409, 734, 749; 493/143; 53/247, 540, 542; 271/84; 221/175, 178, 180

[56] References Cited

U.S. PATENT DOCUMENTS 2,763,360  9/1956  Gibson ................................. 198/412
3,491,633  1/1970  White ............................. 414/105 X
3,687,445  8/1972  Becker ............................. 271/84 X Primary Examiner—Robert B. Reeves
Assistant Examiner—Douglas D. Watts
Attorney, Agent, or Firm—Cynthia Berlow

[57] ABSTRACT

A takeoff-delivery mechanism for cup-like containers is provided with a pusher device that is operated repeatedly to remove stacks containing a predetermined number of containers from the front of a horizontal supply stack while containers are being fed to the rear thereof. Initially, each removed stack is fed to a horizontal delivery device which is then pivoted by moving its front end upward until the delivery device is generally vertical. The removed stack is discharged from the delivery device through the now downwardly facing rear thereof into a receiving device where the removed stack remains generally vertical.

7 Claims, 8 Drawing Figures

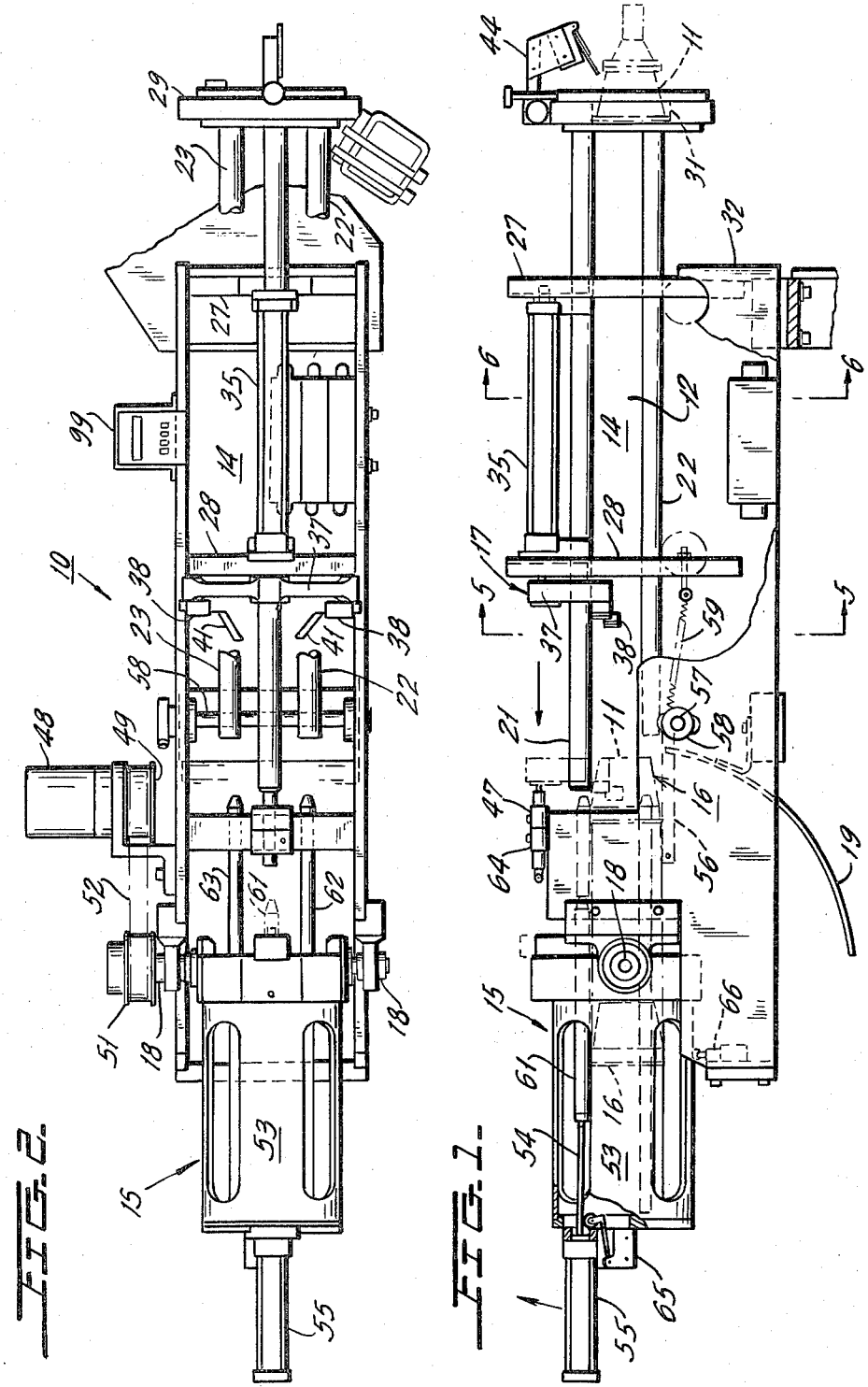

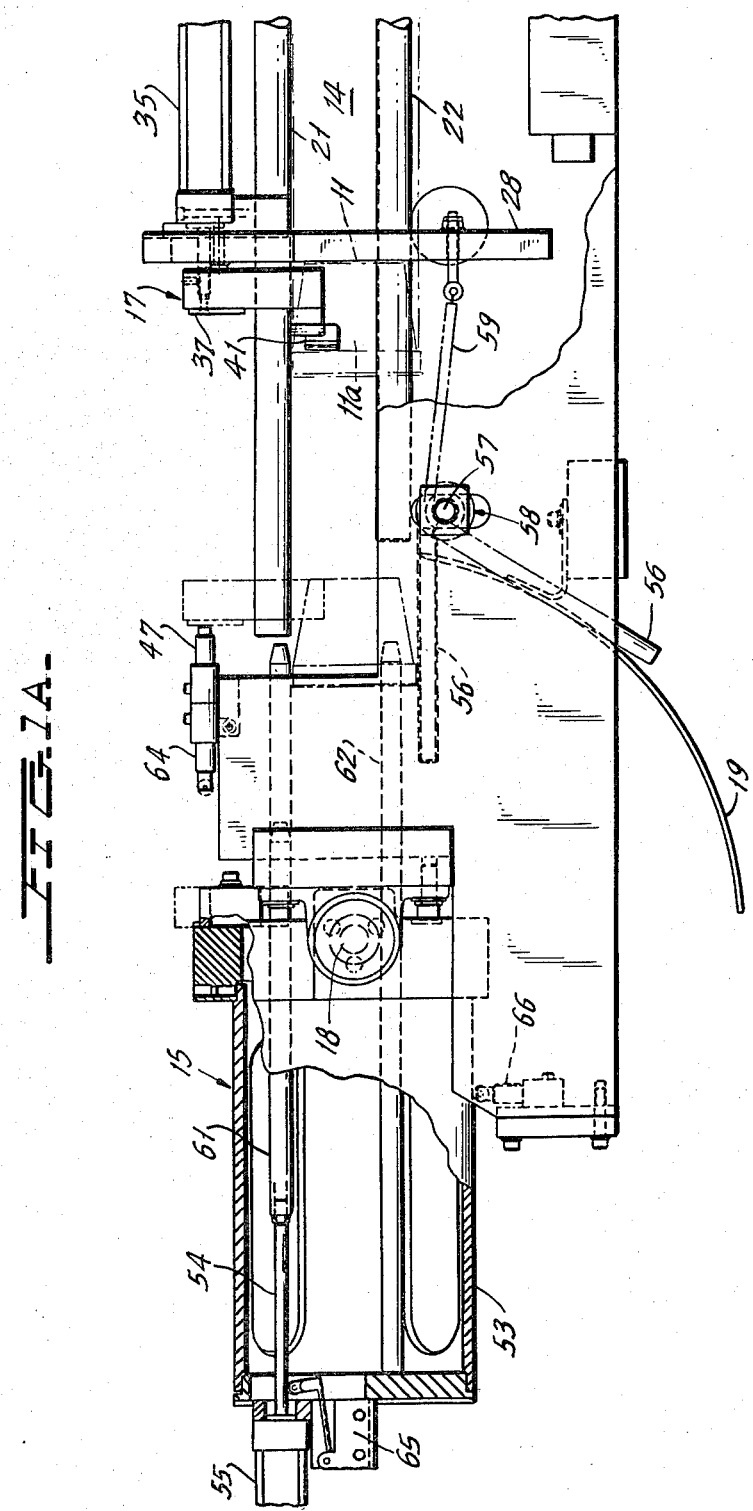

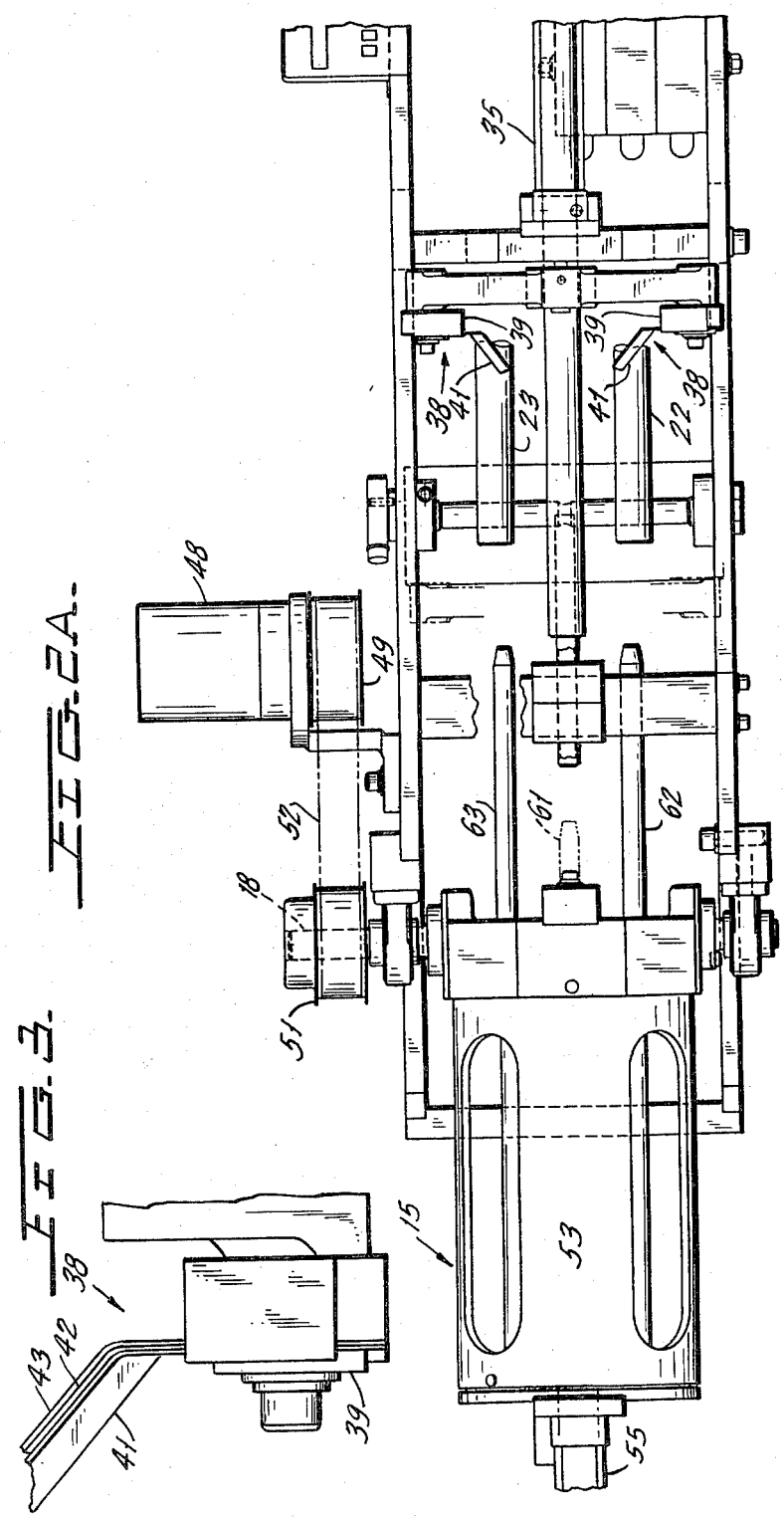

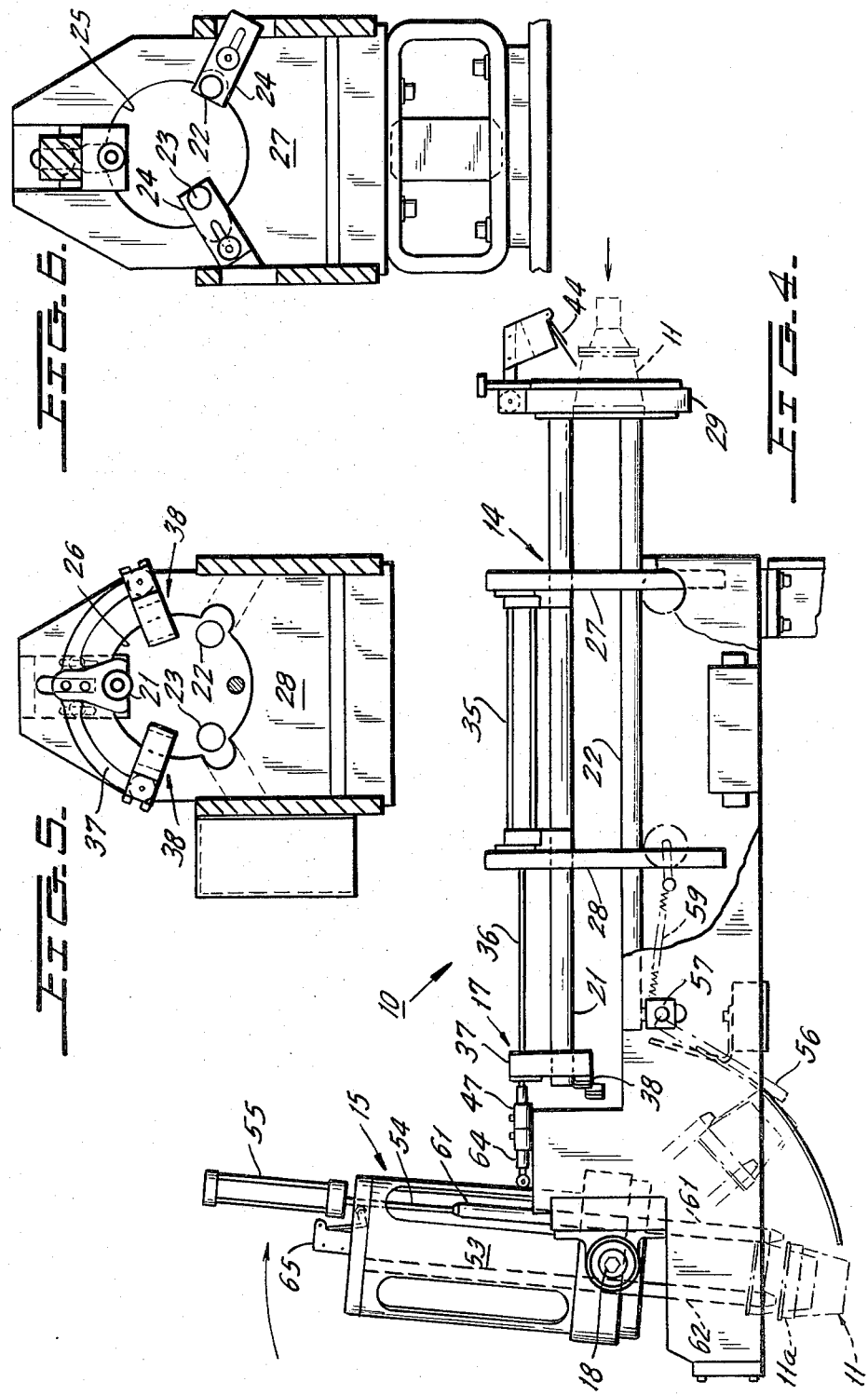

CUP-STACK DELIVERY MECHANISM

This invention relates to apparatus for handling cup-like containers and more particularly relates to a takeoff-delivery mechanism for delivering stacks, each of which contains a selected number of cup-like containers.

U.S. Pat. No. 3,645,201, issued Feb. 29, 1972 to J. M. Jackson for A Multicolor Printing Machine For Cylindrical and Frustoconical Objects describes a decorator for tapered cup-like containers. In this decorator, a large turret structure is angularly stepped about a vertical axis to deliver containers to a plurality of stations. Between steps, there is a substantial dwell during which a container is operated upon. That is, each container is delivered to the turret at a loading station and is carried to a plurality of alternate printing and curing or drying stations. Thereafter, at a takeoff station the container is removed from the turret.

Typically, at the takeoff station each container is delivered to the rear of a horizontal stack of containers, as shown in the J. M. Jackson U.S. Pat. No. 3,834,522 issued Sept. 10, 1974 for a Takeoff and Stacker For Container Printing Machine. Decorated containers are removed from the takeoff stack and packed in a shipping container or other transport means.

In the prior art, the packing operation was usually done entirely by hand, requiring the almost constant attention of one or more operators. Increased decorator speed, now in the range of 300 containers per minute, has made the packing operation more difficult, especially when an accurate container count is required.

In order to overcome the foregoing disadvantages of the prior art, the instant invention provides a mechanized takeoff-delivery mechanism which removes a stack having a predetermined number of cup-like containers from a horizontal supply stack of these containers. The latter is being replenished at the rear thereof while stacks are being removed from the front.

In particular, pursuant to the instant invention as soon as a counting device detects the addition of a predetermined number of containers to the rear of the supply stack, a pusher means removes a stack containing this predetermined number of containers from the front of the supply stack and transfers this removed stack to a delivery device. The latter is in a horizontal position to receive the removed stack and after reception of the removed stack is completed, the front of the delivery device is tilted upward, so that the delivery device assumes a generally vertical delivery position wherein the removed stack is discharged from the delivery device through the now downwardly facing rear end thereof. As soon as the discharge operation is completed, the delivery device is returned to its horizontal position to receive another removed stack.

Accordingly, a primary object of the instant invention is to provide a novel mechanized takeoff-delivery mechanism for cup-like containers.

Another object is to provide a mechanism of this type in which containers discharged in a horizontal position from a decorator are delivered in vertical stacks each containing a predetermined number of containers.

Still another object is to provide a mechanism of this type which is readily adjustable for use with different diameter containers and is provided with means for selecting the number of containers that will be in each of the delivered stacks.

A further object is to provide a mechanism of this type having a novel support means to support each of the removed stacks while it is being transferred from a supply stack of containers to the delivery device.

These objects as well as other objects of the instant invention shall become readily apparent after reading the following description of the accompanying drawings in which:

FIG. 1 is a side elevation of a takeoff-delivery mechanism constructed in accordance with teachings of the instant invention.

FIG. 1A is an enlarged fragmentary portion of FIG. 1.

FIG. 2 is a plan view of the mechanism of FIG. 1.

FIG. 2A is an enlarged fragmentary portion of FIG. 2.

FIG. 3 is an enlarged plan view of one of the spring pusher elements.

FIG. 4 is a side elevation of the mechanism with its delivery device moved from the horizontal position of FIG. 1 to a vertical position.

FIGS. 5 and 6 are cross-sections taken through the respective lines 5—5 and 6—6 of FIG. 1 looking in the direction of arrows 5—5.

Now referring to the figures, takeoff-delivery mechanism 10 of FIGS. 1 and 2 receives tapered cup-like containers 11 from a restacker of the type described in the copending application Ser. No. 132,513, filed Mar. 21, 1980, entitled Takeoff and Restacking Device For Cup-Like Containers with J. P. Skrypek et al as the inventors and assigned to the assignee of the instant invention. Containers 11 are formed into a horizontally extending rear fed supply stack 12 which forms in accumulator section 14. Aligned with and disposed forward of accumulator 14 is delivery device 15 to which delivered stacks 16 of containers 11 are fed by transfer device 17. As will hereinafter become apparent, each removed stack 16 is taken from the front end of supply stack 12.

After delivery device 15, in the horizontal receiving position of FIG. 1, receives removed stack 16, delivery device 15 is pivoted clockwise about aligned stub shafts 18, 18 as a center by raising the front end of delivery device 15. During this clockwise motion of delivery device 15, gravity forces delivered stack 16 out the rear of device 15. Prior to delivery device 15 reaching its final vertical position of FIG. 4, the bottom of stack 16 is supported by curved guide 19 which extends downward and forward of accumulator 14. When delivered stack 16 moves forward of the free end of support guide 19 delivered stack 16 is free to fall under the influence of gravity into a receiving means (not shown) such as a packing case or conveyor.

In greater detail, accumulator 14 includes three horizontal rods 21, 22, 23 arranged to define an elongated horizontal chute which receives containers from a turret-type decorator (not shown). Rods 21-23 are mounted for adjustment by movement transverse to their longitudinal axes to define a chute of suitable size for the particular container 11 being received. Rods 21-23 extend through central apertures 25, 26 in the respective support members 27, 28 and are connected to the latter by hangers 24. The rear ends of rods 21-23 extend to ring member 29 having adjustable aperture 31 constituting an entrance for containers 11 entering the chute defined by rods 21-23. Support 27 is fixedly secured to stationary frame member 32. Operating part or power cylinder 35 of transfer device 17 is a stationary element having its opposite ends secured to the respective support members 27, 28. Power cylinder 35 extends parallel to rods 21-23 and is provided with extendible rod 36 having arcuate carrier 37 mounted at its free forward end. Individual pusher assemblies 38, 38 are mounted to opposite ends of carrier 37. Assembly 38 includes a stack of leaf springs 41, 42, 43 extending radially inward from support 39. For a reason to be hereinafter seen, the most forward spring 41 in the stack 41-43 is longer than the other two springs 42, 43.

Each container 11 fed to mechanism 10 operates input counter 44 which feeds settable control 99 (FIG. 2). As containers 11 move past pusher assemblies 38, 38 in their rearward positions shown in FIGS. 1 and 2, containers 11 deflect spring fingers 41, and the latter immediately spring inward so that their free ends fall behind lip 11a at the forward open end of container 11 (FIG. 1A). Containers 11 do not engage shorter backup springs 42, 43. When rod 36 moves forward, backup springs 42, 43 serve to stiffen the longer spring 41 so that it acts as a rigid member to positively push removed stack 16 forward into delivery device 15. A deformable friction element (not shown) surrounding mouth 31 prevents rearward movement of supply stack 12 as pusher device 17 moves rearward.

When transfer or pusher device 17 reaches its forward position at the end of the delivery stroke, carrier 37 operates switch 47 to actuate motor 48 whose output shaft drives sprocket 49 which is drivingly connected to sprocket 51 by belt 52. Sprocket 51 is keyed to one of the stub shafts 18 which extend outboard from the sides of canister 53. Mounted to canister 53 and extending through the rear end thereof are three rods 61, 62, 63 which are axially aligned with the respective rods 21, 22, 23, when canister 53 is in its horizontal receiving position shown in FIGS. 1 and 2. Rods 61-63 define a chute to receive delivered stack 16. Upper rod 61 is at the rear end of rod 54 which is projected rearward by power cylinder 55 upon actuation thereof.

When switch 47 is actuated motor 48 rotates so as to pivot canister 53 in a clockwise direction with respect to FIG. 1 by raising the forward end of canister 53. During this clockwise pivoting of canister 53 delivered stack 16, under the influence of gravity, is discharged through the rear end of canister 53, as this end moves to the downwardly facing discharge position shown in FIG. 4 wherein canister 53 is substantially vertical. During the initial portion of this movement of canister 53 towards its discharge position, delivered stack 16 is supported by curved support guide 19 which terminates at a position such that there will not be any interference with delivered stack 16 as it is being discharged from canister 53 when the latter is in the discharging position of FIG. 4. As removed stack 16 moves across the gap between rods 22, 23 and the respective rods 62, 63 the removed stack 16 is supported by deflectable support arm 56 which is secured to and extends forward of sleeve 58. The latter is mounted on stationary transverse pivot 57 and is biased in a clockwise direction with respect to FIG. 1 by tension spring 59 having its rear end anchored to stationary support 28. Spring 59 does not provide a sufficient force to support delivered stak 16 as it is being discharged from canister 53.

When delivery device 15 reaches its vertical discharging position of FIG. 4 canister 53 engages and thereby operates switch 64. The latter operates power cylinder 35 to retract rod 36 thereby moving pusher assemblies 38, 38 to their rearmost positions shown in FIG. 1. In addition, operation of switch 64 is affective to actuate power cylinder 55 to retract its operating rod 54 thereby moving rod 61 upward. When the latter is fully retracted, it engages and thereby operates switch 65 which causes motor 48 to rotate in a direction which will cause canister 53 to pivot counterclockwise with respect to FIG. 4 to its horizontal receiving position of FIG. 1. When this latter position is reached, canister 53 engages and thereby operates switch 66 to actuate power cylinder 55 for extending rod 61 to project out the rear of canister 53 to a position adjacent the forward end of rod 21. When the counter portion of settable control 99 next detects a predetermined count of containers 11, power cylinder 35 will be actuated to operate transfer device 17, another delivered stack 16 will be transferred to delivery device 15 and thereafter will be discharged therefrom.

With reference to FIG. 4, it is seen that when delivery device 15 is in its discharging position, canister 53 is approximately 10° clockwise of vertical. This orientation of canister 53 is advantageous when the receiving means (not shown) is provided with a reference wall that is neither perfectly vertical nor perfectly horizontal.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. A takeoff-delivery mechanism for cup-like containers, said mechanism including an accumulator wherein a horizontal supply stack of nested containers is replenished by adding containers to such supply stack at its rear end; a delivery device disposed forward of said accumulator; a transfer device for delivering removed stacks, each containing a predetermined number of containers, from a supply stack in said accumulator to said delivery device; said delivery device receiving each removed stack in a horizontal position and being operable to discharge removed stacks therefrom in a vertical position into a receiving means; said delivery device receiving a removed stack through the rear end of the delivery device; said delivery device being generally horizontal when receiving removed stacks and being generally vertical when discharging removed stacks; said delivery device having the front end thereof raised to discharge removed stacks through the rear end of the delivery device.

2. A take-off-delivery mechanism as set forth in claim 1 in which the transfer device operates to deliver removed stacks to said delivery device while containers continue to be fed to the rear of the supply stack in the accumulator.

3. A takeoff-delivery mechanism as set forth in claim 1 also including a support guide at the front of the accumulator; said support guide extending forward and downward in operative position to support each removed stack while the front end of the delivery device is being raised.

4. A takeoff-delivery mechanism as set forth in claim 1 also including a deflectable support biased to a normal horizontal position to support a removed stack while it is being delivered to said delivery device; said deflectable support being deflected downward by the weight of a removed stack as the front end of the delivery device is being raised.

5. A takeoff-delivery mechanism as set forth in claim 1, said delivery device including an elongated guideway to position each removed stack as it enters the delivery device and is being discharged therefrom; said guideway having a first longitudinally movable rear portion which is disposed at the top of said guideway while the latter is in a horizontal position to receive a removed stack; means for retracting said rear portion upwardly when said guideway is in a vertical position for discharging a removed stack; said rear portion being retracted while said guideway is being moved from its vertical position to its horizontal position so as not to interfere with forward movement of the supply stack as the latter is being replenished.

6. A takeoff-delivery mechanism for cup-like containers, said mechanism including an accumulator wherein a horizontal supply stack of nested containers is replenished by adding containers to such supply stack at its rear end; a delivery device disposed forward of said accumulator; a transfer device for delivering removed stacks, each containing a predetermined number of containers, from a supply stack in said accumulator to said delivery device; said delivery device being operable to discharge removed stacks therefrom into a receiving means; said transfer device comprising a horizontally movable pusher means including a first spring finger means section which engages a delivered stack to transfer same to the delivery device; said first spring finger means section including a first stack of leaf springs extending inward from a support means, with the most forward spring in the first stack being longer than those to the rear thereof whereby with respect to forces applied to said stack at its end remote from said support means said most forward spring is readily deflectable forward and is relatively stiff to rearward deflection.

7. A takeoff-delivery mechanism as set forth in claim 6 in which the pusher means also includes a second spring finger means section of substantially the same construction as the first spring finger means section; said first and second spring finger means sections being operatively positioned for substantially simultaneous engagement with a delivery stack at spaced locations in a common vertical plane disposed perpendicular to direction of movement of the pusher means.

* * * * *